United States Patent [19]

Phillips

[11] Patent Number: 5,033,239
[45] Date of Patent: Jul. 23, 1991

[54] DISPOSABLE HOB AND METHOD OF GRINDING THE SAME

[75] Inventor: Robert P. Phillips, Loves Park, Ill.

[73] Assignee: Pfauter-MAAG Cutting Tools Limited Partnership, Loves Park, Ill.

[21] Appl. No.: 537,691

[22] Filed: Jun. 14, 1990

[51] Int. Cl.$^5$ ............................................. B23F 21/16
[52] U.S. Cl. ...................................... 51/288; 51/287; 407/23
[58] Field of Search ....................... 409/11; 407/23, 24, 407/25; 51/288, 287

[56] References Cited

U.S. PATENT DOCUMENTS

| | | | |
|---|---|---|---|
| 1,648,470 | 11/1927 | Anderson | 407/23 |
| 1,659,226 | 2/1928 | Wildhaber | 51/288 |
| 1,669,887 | 5/1928 | Wildhaber | 51/288 |
| 1,778,541 | 10/1930 | Wildhaber | 51/288 |
| 2,112,455 | 3/1938 | Edgar | 407/23 |

FOREIGN PATENT DOCUMENTS

| | | | |
|---|---|---|---|
| 282329 | 2/1915 | Fed. Rep. of Germany | 407/23 |
| 638588 | 10/1936 | Fed. Rep. of Germany | 407/23 |
| 943206 | 5/1956 | Fed. Rep. of Germany | 407/23 |
| 185420 | 12/1922 | United Kingdom | 407/23 |

Primary Examiner—Frederick R. Schmidt
Assistant Examiner—Blynn Shideler
Attorney, Agent, or Firm—Leydig, Voit & Mayer

[57] ABSTRACT

A hob for cutting gear teeth includes a plurality of generally axially extending and generally circumferentially spaced rows of teeth. The hob is adapted to be thrown away instead of being re-sharpened when the cutting edges of the teeth become worn. Consistent with this, the teeth—rather than being formed with a conventional re-sharpenable profile—are ground so that the tip, the side flanks and the root of each tooth are of a circumferentially concave shape. The grinding is effected by a unique positional mode in which the hob blank is held stationary and in which the grinding wheel is located relative to the blank in such a manner as to enable the use of a wheel of the largest possible diameter for the design criteria of the particular hob being formed.

12 Claims, 3 Drawing Sheets

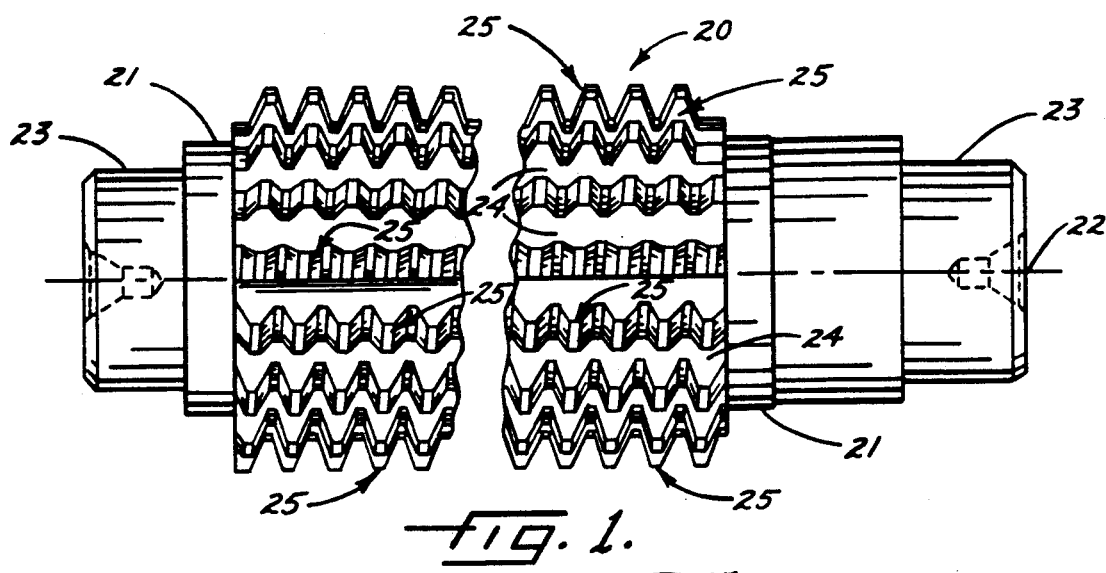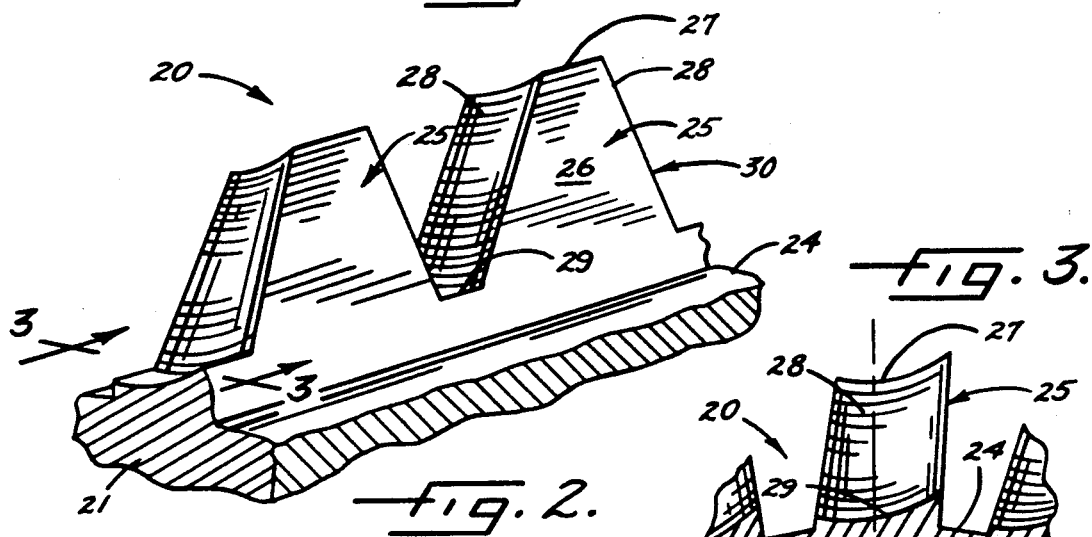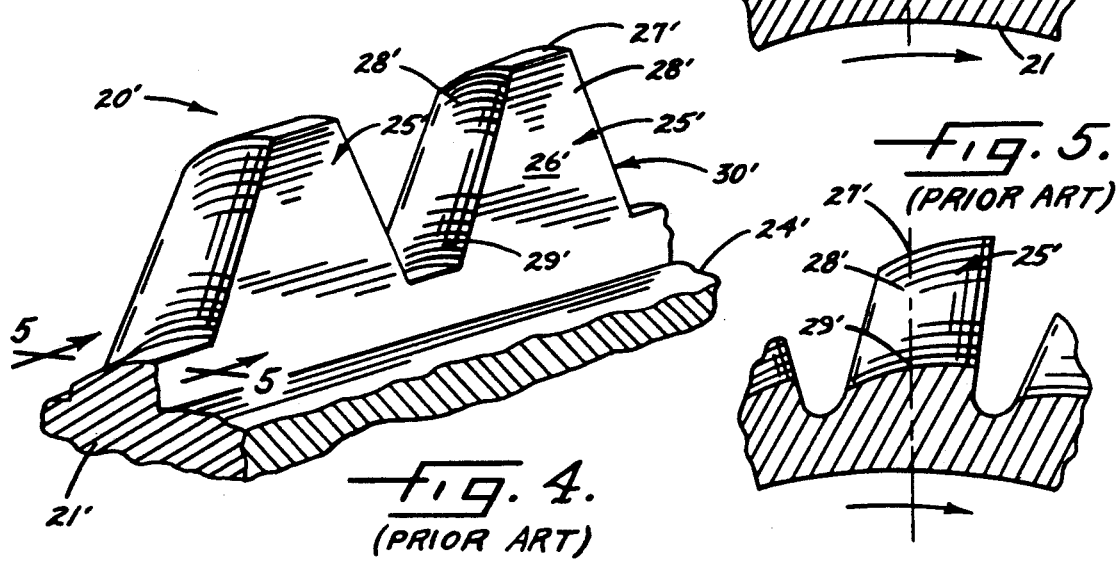

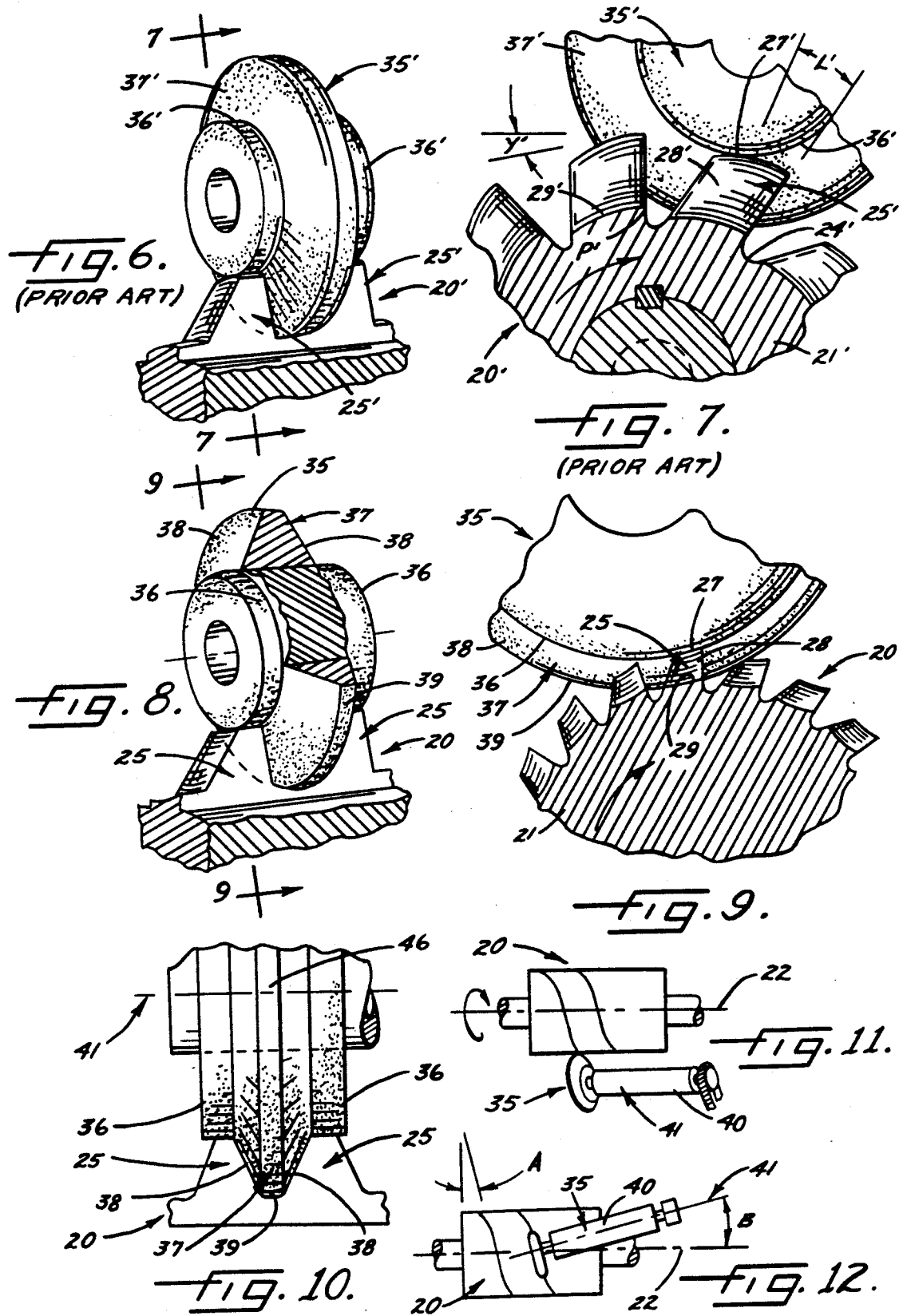

DISPOSABLE HOB AND METHOD OF GRINDING THE SAME

BACKGROUND OF THE INVENTION

This invention relates to a hob for generating gear teeth on a gear blank.

Hobs have been known for many years and basically comprise a thread in the form of a series of teeth which extend helically around and along a hob body such that the teeth are spaced axially and angularly from one another. The teeth thus are arranged in a plurality of generally axially extending and generally circumferentially spaced rows with the teeth of each row being spaced generally axially from each other.

Each tooth includes a leading cutting face, a pair of side flanks, an outer tip and a root. A cutting edge is defined along the junction of the cutting face with the flanks and the tip. The flanks and the tip are appropriately relieved or angled in order to provide cutting clearance for the cutting edge. High clearance angles are desirable in order to avoid excessive wear during cutting.

Hobs which are in present day commercial use are adapted to be re-sharpened at the cutting face after the cutting edge becomes worn. Thus, the teeth as originally manufactured are shaped so as to enable each tooth to retain a proper cutting form when the hob is subsequently re-sharpened.

In manufacturing a conventional hob, the teeth are milled and then are backed off to provide the necessary cutting clearance. Thereafter, the hob is hardened and finish ground. During the finish grinding operation, the hob is rotated relative to a rotating grinding wheel which is fed into the hob in such a manner as to cause the tip, the flanks and the root of the tooth to be shaped as Archimedean spirals. This grinding process shapes the tooth in such a manner as to enable the tooth to be later re-sharpened while maintaining the same clearance angles.

Grinding of a conventional hob involves a compromise between the clearance angle, the usable tooth length and the grinding wheel diameter. As mentioned above, high clearance angles are desirable to enable free cutting and high performance. In a conventional hob, it is important for the teeth to have a long usable length so that the teeth may be re-sharpened many times. It also is desirable to use a grinding wheel of large diameter in order to reduce wheel wear and to minimize the frequency with which the wheel must be dressed. The diameter of the grinding wheel, however, is limited due to the fact that the wheel cannot interfere with the tooth which is circumferentially adjacent the tooth being ground. If the grinding wheel diameter and the clearance angle are increased, the usable tooth length must be decreased. Thus, a compromise of these factors must be reached in designing the hob.

Re-sharpening of a gear cutting tool is time-consuming and must be performed with high precision. In order to avoid the need for a re-sharpening operation, the assignee of the present invention has developed a throw-away gear cutting tool. Such a tool is disclosed in Haug U.S. Pat. No. 4,576,527 and takes the form of a thin cutting wafer which constitutes part of a gear shaper cutter. In many cases, it is more economical to simply throw away the worn wafer and replace the worn wafer with a new wafer than to re-sharpen a conventional shaper cutter.

Consistent with this, it is contemplated that it may be feasible to simply throw away a worn hob rather than to incur the expense of a re-sharpening operation. In order to achieve this, however, it is necessary to manufacture the hob on a very economical basis so that the first cost of a replacement hob is comparatively low. Also, it is necessary that the hob be designed to achieve production rates which are sufficiently high to justify the cost of the hob. In other words, for a disposable hob to be commercially feasible, the hob must produce a total cost benefit which is greater than that realized through the use of a conventional re-sharpenable hob.

SUMMARY OF THE INVENTION

The general aim of the present invention is to provide a throw-away hob which can be produced so economically and which achieves such high production rates that the overall cost of purchasing and using the throw-away hob is less than the costs associated with a conventional re-sharpenable hob.

A more detailed object of the invention is to provide a hob which can be ground with high tooth clearance angles in a relatively economical manner by a grinding wheel of comparatively large diameter and which, at the same time, contains a larger number of teeth on a body of a given diameter so as to enable the hob to achieve high production rates.

In still a more detailed sense, the invention resides in grinding the hob in a positional grinding mode in which the hob is held stationary during the grinding and in which the grinding wheel is located relative to the hob in such a position as to enable the use of the largest possible grinding wheel consistent with the design criteria of the hob.

The invention also is characterized by the provision of a hob having teeth with circumferentially concave outer tips, circumferentially concave side flanks and circumferentially concave roots.

These and other objects and advantages of the invention will become more apparent from the following detailed description when taken in conjunction with the accompanying drawings.

BRIEF DESCRIPTION OF THE DRAWINGS

FIG. 1 is a side elevational view of a new and improved hob incorporating the unique features of the present invention.

FIG. 2 is an enlarged perspective view of two axially adjacent teeth of the hob shown in FIG. 1.

FIG. 3 is a cross-sectional view taken substantially along the line 3—3 of FIG. 2 and shows one of the teeth of the hob of the invention.

FIG. 4 is a view similar to FIG. 2 but shows two axially adjacent teeth of a conventional prior art hob.

FIG. 5 is a cross-sectional view taken substantially along the line 5—5 of FIG. 4 and shows one of the teeth of the prior art hob.

FIG. 6 is a perspective view schematically showing a grinding wheel acting to grind adjacent teeth of the prior art hob.

FIG. 7 is a cross-section taken substantially along the line 7—7 of FIG. 6.

FIG. 8 is a perspective view schematically showing a grinding wheel acting to grind adjacent teeth of the hob of the invention.

FIG. 9 is a cross-section taken substantially along the line 9—9 of FIG. 8.

FIG. 10 is an elevational view of the grinding wheel and hob shown in FIG. 8.

FIG. 11 is a top plan view showing the relationship between the hob of the invention and the spindle of the grinding wheel.

FIG. 12 is a front elevational view showing the relationship between the hob of the invention and the spindle of the grinding wheel.

DETAILED DESCRIPTION OF THE PREFERRED EMBODIMENT

Figure 13:
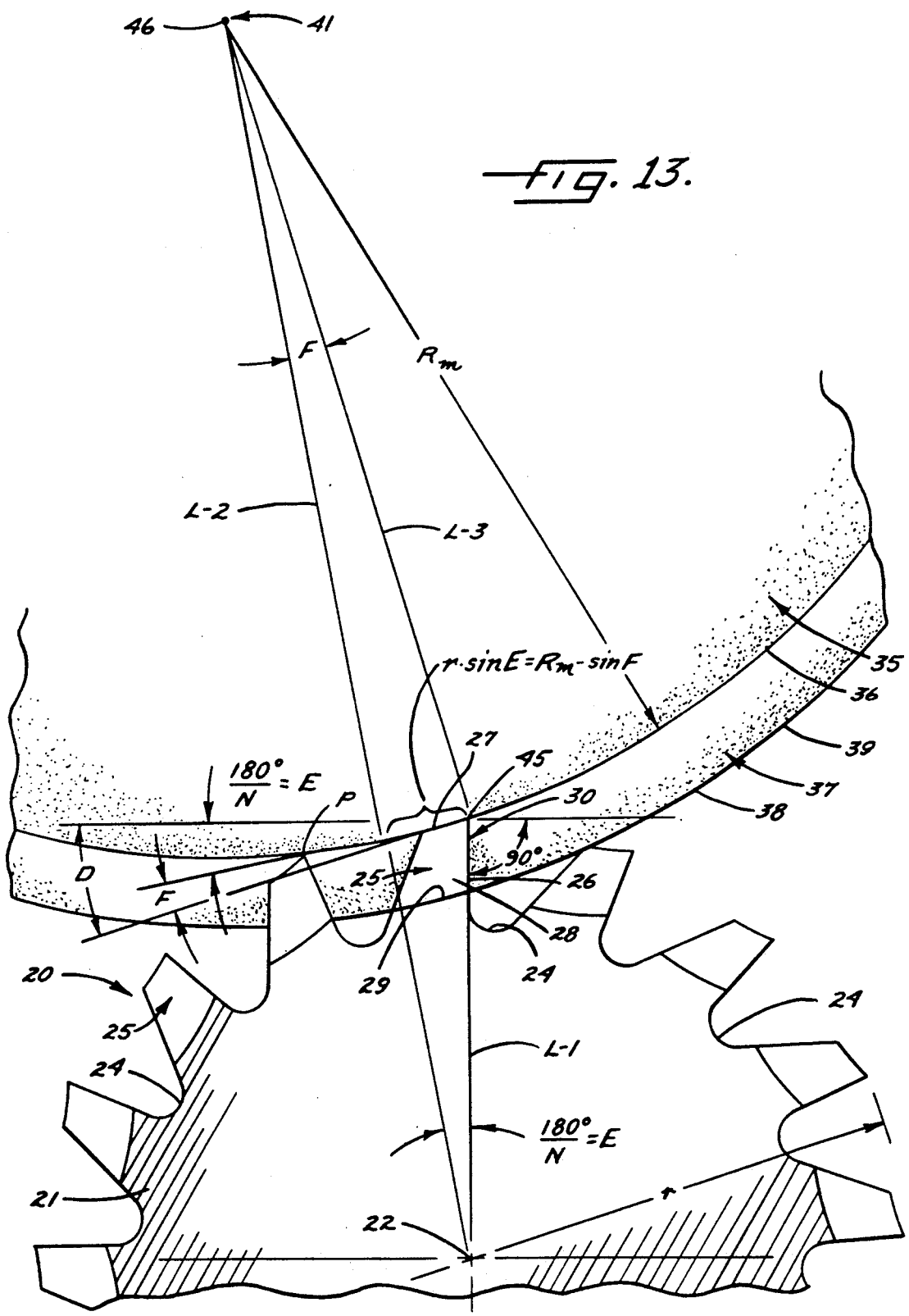
FIG. 13 is an enlarged view similar to FIG. 9 and schematically shows the positional relationship between the hob of the invention and the grinding wheel when the grinding wheel is at full depth.

For purposes of illustration, the invention has been shown in the drawings as embodied in a hob 20 for generating gear teeth on a work blank (not shown). The hob includes a generally cylindrical body 21 having a central axis 22 and formed with reduced-diameter end shanks 23 for mounting the hob in a hobbing machine (not shown).

The hob 20 is conventional insofar as the body 21 is formed with a thread which extends helically along and around the body at a predetermined lead angle A (FIG. 12). Several axially extending and circumferentially spaced gashes 24 (FIG. 1) are milled into the thread and divide each turn of the thread into a series of generally circumferentially spaced teeth 25. By virtue of the lead angle of the thread, the teeth of each turn are spaced generally axially from the teeth of each adjacent turn. Stated differently, the hob 20 includes a plurality of generally axially extending and generally circumferentially spaced rows of teeth with the teeth of each row being spaced generally axially from each other.

As shown in FIGS. 2 and 3, each tooth 25 includes a leading cutting face 26, an outer tip 27, a pair of side flanks 28 and a root 29. A cutting edge 30 is defined along the junction of the cutting face 26 with the outer tip 27 and the side flanks 28.

The hob 20 as described thus far may be formed in the same manner as a conventional hob. That is, a thread may be chased on the body 21 and then the gashes 24 may be milled. Alternatively, the body may be gashed to form angularly spaced flutes and then may be threaded. In a conventional hob, the threading and gashing operations are followed by a so-called back-off operation performed by a conventional back-off machine which machines the form-relieved profile of the teeth. A conventional hob then is hardened and finish ground.

Two axially adjacent teeth 25' of a conventional hob 20' are shown in FIG. 4. The outer tip 27', the side flanks 28' and the root 29' of each tooth 25' of the conventional hob 20' are all convex in the circumferential direction, each surface being shaped as an Archimedean spiral. As a result of such convexity and as a result of the surfaces being shaped as Archimedean spirals, the same tooth profile is maintained when the cutting edge 30' is renewed and sharpened by grinding back the cutting face 26'. Thus, the teeth 25' of the conventional hob 20' may be sharpened several times when necessary to renew the cutting edges 30'.

FIGS. 6 and 7 schematically illustrate the manner of finish grinding the conventional hob 20' with a grinding wheel 35'. The grinding wheel is generally circular and includes a formed periphery defined in part by two axially spaced cylindrical shoulders 36'. Located between the shoulders is a circular disc 37'.

In implementing the grinding operation of the conventional hob 20, the hob and the grinding wheel 35' are rotated simultaneously and, during such rotation, the wheel is fed radially into the hob in such a manner as to cause the tip 27', the side flanks 28' and the root 29' of each tooth 25' to be profiled so as to lie along Archimedean spirals. The grinding wheel is retracted radially in a rapid motion after the grinding of each individual tooth space has been completed. Such a process is referred to as being a dynamic or full form grinding operation in that the hob is rotated as well as the grinding wheel as the grinding takes place.

In designing a conventional hob 20', several factors come into play. It is desirable for each tooth 25' to have a long usable length L' (FIG. 7) so that the tooth may be re-sharpened many times. A high clearance angle Y' at the tip 27' of the tooth is desirable in order to promote high performance and free cutting. It is desirable to be able to form a relatively large number of circumferentially spaced teeth 25' around a body 21' of comparatively small diameter to enable high production rates, to reduce the volume of material required to make the hob and to produce the required involute accuracy on the ultimate gear which is formed by the hob. Another important factor involves the need to use a grinding wheel 35' of large diameter so as to reduce wear of the wheel and reduce the frequency with which the wheel must be dressed. In a conventional hob, these various factors must be traded off against one another in designing the hob due to the fact that the design must take into account the re-sharpening of the teeth and the need to maintain the same profile when the teeth are re-sharpened. Once the design of the hob has been reached, the grinding wheel 35' must be sufficiently small in diameter as to avoid interference between the wheel and the hob 20' at a point P' (FIG. 7) located at the leading end of the root 29' of the teeth 25' which immediately trails the tooth being ground.

The present invention contemplates the provision of a hob 20 which can be manufactured so economically, which can achieve such high production rates and which is so durable that it becomes more cost effective simply to throw away the worn hob rather than to incur the expense of re-sharpening. This is achieved in large by designing the hob 20 so that (1) a relatively large number of circumferentially spaced teeth 25 may be formed around a body 21 of comparatively small diameter (2) high clearance angles are available for high performance cutting (3) a grinding wheel 35 of relatively large diameter may be used to initially profile the teeth 25 without need of a conventional back-off operation and (4) the teeth are long-wearing.

The grinding wheel 35 for use with the hob 20 of the present invention is shown in FIGS. 8 to 12. Such a wheel is generally circular and includes a formed periphery defined in part by two axially spaced circular shoulders 36. Each shoulder is convex in the circumferential direction but is substantially straight in the axial direction. Located between the shoulders is an annular rib 37 which is generally trapezoidal in axial cross-section (see FIGS. 8 and 10). The rib includes two oppositely sloped side faces 38 which are shaped as frustums, each face being convex in the circumferential direction and being substantially straight in the radial direction. The extreme outer periphery 39 of the rib is convex in the circumferential direction and may be either straight or convex in the axial direction.

In using the grinding wheel 35 to profile the teeth 25 of the hob 20, the wheel is supported on a power-rotated spindle 40 (FIGS. 11 and 12) to turn about an axis 41 coinciding with the axis of the wheel. The spindle 40 is positioned relative to the hob 20 such that the axis 41 of the wheel and the axis 22 of the hob lie in parallel planes (see FIG. 11). The axis 41 of the wheel 35, however, is inclined relative to the axis 22 of the hob at an acute angle B (FIG. 12) coinciding with the lead angle A of the hob thread at the pitch diameter so that the wheel is positioned to conform to and accommodate the lead angle.

With the hob 20 and the wheel 35 positioned as described above, the wheel is fed into the hob (or, as an alternative, the hob may be fed into the wheel) while the wheel is rotating and while the hob is held rotationally stationary. Such feeding causes the outer periphery 39 of the rib 37 to grind the bottom of the root 29 between adjacent axially spaced teeth 25, causes the side faces 38 of the rib 37 to grind adjacent side flanks 28 of such teeth, causes one of the shoulders 36 to grind just slightly more than one-half of the axial length of the tip 27 of one tooth, and causes the other shoulder 36 to grind just slightly more than one-half of the axial length of the tip 27 of the axially adjacent tooth 25. As a result of such grinding, the root 29 is profiled with a shape which is concave both in the circumferential direction and is either straight or concave in the axial direction while each side flank 28 is profiled with a shape which is concave in the circumferential direction and is straight in the radial direction. Subsequently, the grinding wheel acts in the next axial space to cause one of the shoulders 36 to grind the remaining half of the tip 27 of the first tooth. When the tip 27 is completely ground, it is concave in the circumferential direction and is straight in the axial direction. By virtue of the concavity, a top clearance angle D (FIG. 13) is established along the tip 27 of the tooth, the clearance angle being that angle between (1) a plane tangent to the hob at a point 45 on the cutting edge 30 at the tip 27 and (2) a plane tangent to one of the shoulders 36 of the wheel 35 at the point 45.

In carrying out the invention, the grinding wheel 35 is located relative to the hob 20 in such a position as to enable the use of a grinding wheel of the largest possible diameter for a hob of a given design. Specifically, the grinding wheel is located such that, when the wheel is at full depth, a point 46 (FIGS. 10 and 13) located at the axial center of the wheel is offset rearwardly (relative to the cutting face 26 of the tooth 25 being ground) from a line L-1 extending radially of the hob 20 from the axis 22 thereof through the point 45 on the cutting edge 30 at the tip 27 which is being ground. This becomes more apparent with reference to FIG. 13 and by considering that:

D = The top clearance angle (as previously defined) as selected and optimized by design;

E = an angle having a value of $$\frac{180°}{N}$$

where N is the number of gashes 24 or number of rows of teeth 25 on the hob;

F = The engagement angle of the wheel 35 (i.e., that angle between (i) a line L-2 extending radially from the axial center 46 of the wheel and bisecting the space between the point 45 on the tooth 25 being ground and a point P at the tip of the immediately following tooth, and (ii) a line L-3 extending radially from the axial center 46 of the wheel to the point 45);

r = The outside radius of the hob 20; and $R_m$ = The maximum allowable radius of the shoulder 36 of the grinding wheel 35 to avoid interference of the shoulder with the point P at the tip of the tooth immediately following the tooth being ground.

Given the foregoing and with further reference to FIG. 13, it is apparent that:

$$D = E + F \quad (1)$$

and therefore:

$$F = D - E \quad (2)$$

Also:

$$r \sin E = R_m \sin F \quad (3)$$

and thus:

$$R_m = \frac{r \sin E}{\sin F} = r \cdot \frac{\sin \frac{180°}{N}}{\sin \left( D - \frac{180°}{N} \right)} \quad (4)$$

Accordingly, by designing a hob with a given outside radius r, with a given number of rows of teeth N and with a given top angle D, one may establish the wheel engagement angle F and may calculate $R_m$ or the maximum radius allowable for the shoulder 36 of the grinding wheel 35 and consequently the maximum radius of the outer wheel periphery 39.

By way of specific example, assume that one wishes to produce a hob having a radius r of 0.787", having a top angle D of 18.0 degrees, having 16 gashes or teeth rows (N) and having a diametrical pitch of 14. With these parameters given:

$$E = \frac{180°}{N} = \frac{180°}{16} = 11.25° \quad (5)$$

and thus:

$$F = D - E = 18.0° - 11.25° = 6.75° \quad (6)$$

and:

$$R_m = \frac{0.787 \sin 11.25°}{\sin 6.75°} = 1.306" \quad (7)$$

with the effect that a grinding wheel 35 having a shoulder 36 with a diameter as large as 2.612" may be used for grinding the tooth without interfering with the immediately adjacent following tooth.

To summarize, when the grinding wheel 35 is at full depth, the axial center 46 of the wheel is located such that the line L-2 is angled rearwardly from the line L-1 by the angle E. This enables the radius of the shoulder 36 of the wheel to be as large as the value of $$\frac{r \sin E}{\sin F}$$

so as to maximize the diameter of wheel which may be used to grind the hob.

To enable the teeth 25 of the hob 20 to be long-wearing and to cut for a long period of time before dulling, the teeth are coated with a thin film of titanium nitride after the teeth have been ground. Such a coating significantly increases the effective service life of the teeth.

From the foregoing, it will be apparent that the present invention brings to the art a new and improved hob 20 which is designed so as to be thrown away when the teeth 25 finally become dull. The disposable hob of the present invention can effectively compete with conventional re-sharpenable hobs because of several factors. First, with the disposable hob, the tooth configuration behind the cutting face 26 is of no consequence as long as the configuration does not cause any interference during cutting and thus the teeth 25 can be designed with optimum clearance angles for high performance and can be ground with a relatively large grinding wheel for efficient production. In contrast to a conventional hob which must be backed off and then finish ground, the tooth profile and required clearances of the disposable hob are ground in one setup after hardening.

Since the tooth portions behind the original cutting face 26 of the disposable hob 20 are not re-sharpened, the circumferential dimension of each tooth 25 need only be sufficiently great to cause the tooth to possess the strength necessary to withstand the loads imposed on the tooth during cutting. As a result, circumferentially shorter teeth may be used to enable a relatively large number of rows of teeth to be formed around a hob body 21 of comparatively small diameter. A small diameter hob with many rows of teeth can rotate at high speed to achieve high production rates and, at the same time, only a relatively small volume of material is required to make the hob. Moreover, the throw away hobs can be manufactured and ground exactly the same diameters so that the hobbing machine may be always set the same and need not be readjusted as is required between each re-sharpening of a conventional hob.

The grinding method described above provides greater clearance angles at the tips 27 of the teeth 25 than at the roots 29, which is generally desirable and especially when protuberances are involved. And, as discussed, the positional grinding mode enables the use of a large diameter grinding wheel, which is important not only to minimize the frequency of wheel dressing but also because wheel wear is exacerbated due to the fact that the relief profile is formed by grinding rather than by a back off operation.

The foregoing disclosure contemplates that the hob blank will be rough-formed with teeth before the grinding operation is performed. It should be appreciated, however, that a hob with radially short teeth may be made from a gashed body where teeth are first formed in the flutes by the grinding operation which has been described.

I claim:

1. A hob comprising a body having a central axis and having a plurality of generally axially extending and generally circumferentially spaced rows of teeth, the teeth in each row being spaced generally axially from one another, each tooth having a circumferentially concave and generally radially facing outer tip and having a pair of circumferentially concave and generally axially facing side flanks, the bottom of the space between each pair of adjacent axially spaced teeth being circumferentially concave.

2. A hob as defined in claim 1 in which each side flank of each tooth is straight in the radial direction.

3. A hob as defined in claim 1 in which the root of each tooth is straight in the axial direction.

4. A hob as defined in claim 2 in which the root of each tooth is concave in the axial direction.

5. A hob as defined in claim 3 in which the tip of each tooth is straight in the axial direction.

6. A hob as defined in claim 4 in which the tip of each tooth is straight in the axial direction.

7. A method of grinding a generally cylindrical hob blank having a central axis and having a plurality of generally axially extending and generally circumferentially spaced rows of rough formed teeth, the teeth in each row being spaced axially from one another, each tooth having an outer forward cutting point located along a first line which extends radially of said blank, said method comprising the steps of, providing a generally circular grinding wheel having a formed periphery defined by two axially spaced and circumferentially convex shoulders and by an annular rib located between and projecting radially from said shoulders, said rib being generally trapezoidal in axial cross-section, positioning said wheel to rotate about a second axis, said wheel being positioned such that a second line extending from the central axis of the hob blank to a predetermined point located at the axial center of said wheel is angled rearwardly from said first line, said blank and said wheel being located with said rib positioned in the space between adjacent axially spaced teeth and with said shoulders overlying portions of the tips of said adjacent teeth, and rotating said wheel about said second axis while said hob is stationary so as to cause said shoulders to grind a circumferentially concave form on the tip portions of said adjacent teeth and to cause said rib to grind circumferentially concave forms on adjacent flanks of adjacent teeth and at the bottom of the space between said adjacent teeth.

8. A method as defined in claim 7 in which said second line is angled rearwardly from said first line by an angle E equal substantially to $$\frac{180°}{N}$$

where N is the number of axially extending rows of teeth.

9. A method as defined in claim 8 in which the radius R of each of said shoulders is approximately, equal to and does not exceed the value of $$\frac{r \sin E}{\sin F}$$

where r is the length of a radius extending from the axis of said hob to said cutting point and where F is the angle between said second line and a third line extending from said cutting point to said predetermined point at the axial center of said grinding wheel.

10. A method of grinding a rough formed and generally cylindrical hob blank having a central axis and having a plurality of generally axially extending and generally circumferentially spaced rows of flutes, each flute having a forward face with an outer edge containing a first point which lies along a first line extending radially of said blank, said method comprising the steps of, providing a generally circular grinding wheel having a formed periphery defined by two axially spaced and circumferentially convex shoulders and by an annular rib located between and projecting radially from said shoulders, said rib being generally trapezoidal in cross-section, positioning said wheel to rotate about a second axis, said second axis being located such that a second line extending from the central axis of the hob blank to a second point disposed at the axial center of said wheel is angled rearwardly from said first line, and rotating said wheel about said second axis while the periphery of said wheel is in engagement with one of said flutes and while said blank is stationary so as to cause said rib to grind in said one flute a space having a circumferentially concave bottom and circumferentially concave side flanks and to cause said shoulders to grind circumferentially concave forms on the outer tip of said one flute at opposite sides of said space.

11. A method as defined in claim 10 in which said second line is angled rearwardly from said first line by an angle E equal substantially to $$\frac{180°}{N}$$

where N is the number of axially extending rows of flutes.

12. A method as defined in claim 11 in which the radius R of each of said shoulders is approximately equal to and does not exceed the value of $$\frac{r \sin E}{\sin F}$$

where r is the length of a radius extending from the axis of said hob to said first point and where F is the angle between said second line and a third line extending from said first point to said second point.

* * * * *